(12) United States Patent
Heinn et al.

(10) Patent No.: US 7,076,909 B2
(45) Date of Patent: Jul. 18, 2006

(54) DECOY SLED

(76) Inventors: Darrell A. Heinn, 30235 Falcon Ave., Stacy, MN (US) 55079-9410; Timothy J. Foster, 1024 80th St., Amery, WI (US) 54001

( * ) Notice: Subject to any disclaimer, the term of this patent is extended or adjusted under 35 U.S.C. 154(b) by 0 days.

(21) Appl. No.: 10/965,247

(22) Filed: Oct. 14, 2004

(65) Prior Publication Data
US 2006/0080884 A1    Apr. 20, 2006

(51) Int. Cl.
*A01M 31/06* (2006.01)
(52) U.S. Cl. .................................. 43/2; 43/3
(58) Field of Classification Search ............... 43/2, 43/3; D22/125; D12/6; 248/176.1; 446/280; 280/845
See application file for complete search history.

(56) References Cited

U.S. PATENT DOCUMENTS

| | | | |
|---|---|---|---|
| 1,314,276 A * | 8/1919 | Leland .......................... 43/2 |
| 5,098,050 A * | 3/1992 | Bruns et al. ............. 248/176.1 |
| 5,168,649 A * | 12/1992 | Wright .............................. 43/2 |
| D377,507 S * | 1/1997 | Thomas, Sr. ................ D21/534 |
| D390,500 S * | 2/1998 | Walker ......................... D12/9 |
| 5,903,997 A * | 5/1999 | Jacob .............................. 43/1 |
| 6,408,558 B1 * | 6/2002 | Cornell et al. .................... 43/2 |
| 6,574,902 B1 * | 6/2003 | Conger ............................ 43/2 |

* cited by examiner

*Primary Examiner*—Kurt Rowan
(74) *Attorney, Agent, or Firm*—Patterson, Thuente, Skaar & Christensen, P.A.

(57) ABSTRACT

A sled for supporting a decoy, comprising a rod defining a first runner and second runner separated by the midpoint of the rod. The first runner and the second runner have a mid section substantially parallel to the horizontal plane, and a front section angled at least 20 degrees from the horizontal plane. A support comprising a first end, a second end, and a midpoint is also disclosed. The first end of the support is fastened to the mid section of the first runner and the second end of the support is fastened to the mid section of the second runner. A post is fastened to the support and an animal decoy is supported by the post. A first string spans from the animal decoy to the midpoint of the rod. A second string is attached to the midpoint of the rod and allows for remote movement of the sled.

6 Claims, 6 Drawing Sheets

DECOY SLED

FIELD OF THE INVENTION

The invention relates to bird hunting decoys and, more specifically, mobile supports for deployed decoys.

BACKGROUND OF THE INVENTION

Wild turkeys are wary animals with acute senses. Male turkeys are territorial and will challenge another male turkey in an established geographical range. Turkeys of either gender may approach other turkeys to establish dominance in a pecking order. Turkeys are large birds but they can fly a substantial distance and thus can very quickly move about in response to situations.

When hunting wild turkeys, it is common for male ("tom") turkeys to hesitate in the bushes and undergrowth at the edge of a clearing, making a clear shot difficult. The presence of a receptive female ("hen") turkey will frequently stimulate an otherwise hesitant tom to enter an open area for purposes of mating with the hen. Accordingly, a variety of decoys have been developed to attract the tom out into a more open area to provide an easier shot at the tom.

Common hunting practice for turkeys and other game may involve tracking or otherwise searching for likely locations, stalking, imitating audible calls, and deployment of one or more decoys followed by lying in wait. The decoys are advantageously lightweight and compact so as to be easily carried to wherever they may be deployed. The decoys need to be deployed quickly and quietly, i.e., assembled or otherwise erected so as to assume a stable realistic pose at a desired location.

A decoy preferably resembles a particular species accurately, at least with regard to attributes that a target species is inclined to notice. The decoy may be quite realistic, or may simply have critical attributes in common with the particular species it emulates, such as a comparable silhouette, color, movement, sound, odor, etc. Decoys that appear realistic to humans are more popular among hunters than those that are obviously artificial. The target species may be prone to respond, positively or negatively, to the same aspects as humans, or possibly other aspects. Visually, many animals are highly sensitive to motion.

Visual mimicry is an important consideration, but not the only one. Decoys should also be inexpensive to manufacture. The decoy should be compact or capable of packing in a manner that permits a hunter to carry a number of decoys into the field. The decoys should individually be very easy to deploy, quickly and silently, in any terrain that may be encountered, such as open grassland, woods or scrub vegetation.

The motion of a decoy can be as important to appearance as the shape and marking of the decoy body. This is particularly true of game animals such as turkeys, which are very sensitive to motion in their surroundings. The specific motion is important. Unnatural motion can be at least as suspicious and/or unconvincing as a lack of any motion.

U.S. Pat. No. 5,570,531 describes a bird decoy with motion associated with the head and neck. The decoy body is stationary. A one-piece head-and-neck portion is mounted to the body so that the head and neck may tilt when sufficient wind prevails. The decoy is helpful in that it moves, but it is not representative of a live animal, whose motion is unlikely to involve displacement of an integrally rigid head and neck relative to a rigid stationary body, even when the animal is standing in place.

U.S. Pat. No. 5,515,637 discloses a decoy in which the decoy body is mounted on a vertical journal axis by bearings. The idea is for ambient breeze to rotate the body on the vertical journal axis without substantial frictional resistance. The journal axis advantageously is set precisely vertical. The weight of the decoy is advantageously balanced evenly on opposite sides of the axis. The mounting comprises a helical spring that enables the breeze to wobble the decoy in the incident direction of the breeze.

In a frictionless rotational mounting of such a type, it is possible that the decoy body may turn one way or the other on the vertical axis, due to wind or another impetus. Turning on a vertical axis may appear natural in some conditions and therefore could be interesting to a game animal. However the wind speed and direction must catch the decoy body just right. If the wind is not at the particular speed and oriented in the specific direction that produces a convincing motion, the motion may be such that the decoy is caused to appear as an obvious fake. This problem is acute if there are several decoys deployed in a group. It might appear natural and interesting, for example, for decoys in a group occasionally to face in a new direction, for example as live animals in a group might face in unison toward the source of a sound. If decoys in a group rotate freely, a gust of wind could cause them to rotate in different directions and to continue beyond a full revolution. Such motion is mechanical and unrealistic.

If the rotation axis of a journal mounting is not at the center of mass, and the rotation axis is tilted relative to vertical, the decoy body will rotate preferentially to a stable rotational position at which the heaviest part of the decoy is at the lowest elevation. A gust of wind may act to rotate the body due to differences in surface area, for example exerting greater pressure on the thicker tail section than the thinner head section, causing a rotational force. This may rotationally displace the heaviest part of the decoy body from the angular position at which the heaviest part is at the lowest possible elevation. When the wind force subsides, the body tends to rotate back to the preferred orientation, because the heaviest part of the decoy body settles back at the preferred lowermost elevation. Typically, there is an associated rotational oscillation of a decreasing amplitude around the preferred rotational orientation, as the body settles back to the preferred orientation.

In response to the considerations set-forth above, several decoys with movable parts have been developed. These movable parts have been limited principally to neck movement, body tilting or raising and lowering of the body. The movement in some instances depends upon wind currents while others devices are string actuated. The U.S. Pat. No. 5,289,654 employs servo motors that are actuated by an RF transmitter. The patentee teaches moving only the head using one servo motor for raising and lowering the head and another for turning the head from one side to another. U.S. Pat. No. 5,036,614 teaches rotating the entire decoy about a vertical axis on a support peg that must be driven into the ground with such rotation being accomplished manually.

The art of turkey decoys has become increasingly high-tech as exemplified by U.S. Pat. No. 6,708,440. The '440 patent discloses a robotic frame having a multiplicity of movable frame portions supporting a flexible decoy cover or figurine. The '440 invention provides a turkey decoy having a plurality of movable parts, which is mounted on a self propelled carriage that moves the decoy from one location to another. Although this invention is an improvement in many respects, it can emit noise during operation or become hung-up in irregular terrain.

Features that improves a decoy with respect to realism and other categories should not add substantially to the cost, weight, or bulk of the decoy. It would be advantageous if realism could be maximized, while preserving the advantages of known decoy arrangements.

SUMMARY OF THE INVENTION

The invention is described with reference to wild turkeys. The invention is also applicable to other particular species. For example, the invention can be applied to decoys representing animals that frequent dry land or water, mammals or birds, prey animals or predators, etc.

The present invention includes a sled for supporting a covering to provide a decoy. The sled comprises a first runner, a second runner, and an arch having a first end, a second end, and a midpoint. The first runner is fastened to the first end of the arch and the second runner is fastened to the second end of the arch. A receiver is located at the midpoint of the arch. The receiver is configured to support at least one post having a vertical axis projecting upwardly from the sled.

In another embodiment, the invention includes a sled for supporting a decoy. The sled comprises a single rod defining a first runner and a second runner separated by the midpoint of the rod. The first runner and the second runner have a mid section substantially parallel to the horizontal plane, a front section angled at least 10 degrees from the horizontal plane, and a rear section angled at least 5 degrees from the horizontal plane. A support comprising a first end, a second end, and a midpoint are also included in the invention. The first end of the support is fastened to the mid section of the first runner and the second end of the support is fastened to the mid section of the second runner. The midpoint of the support is at least 1 inch above the horizontal plane.

In yet another embodiment of the invention, the invention includes a sled for supporting a decoy. The sled comprises a rod defining a first runner and a second runner separated by the midpoint of the rod. The first runner and the second runner have a mid section substantially parallel to the horizontal plane, and a front section angled at least 20 degrees from the horizontal plane. A support comprising a first end, a second end, and a midpoint is also disclosed. The first end of the support is fastened to the mid section of the first runner and the second end of the support is fastened to the mid section of the second runner. A post is fastened to the support and an animal decoy is supported by the post. A first string spans from the animal decoy to the midpoint of the rod. A second string is attached to the midpoint of the rod allows for remote movement of the sled.

DETAILED DESCRIPTION OF THE PREFERRED EMBODIMENTS

Figure 1:
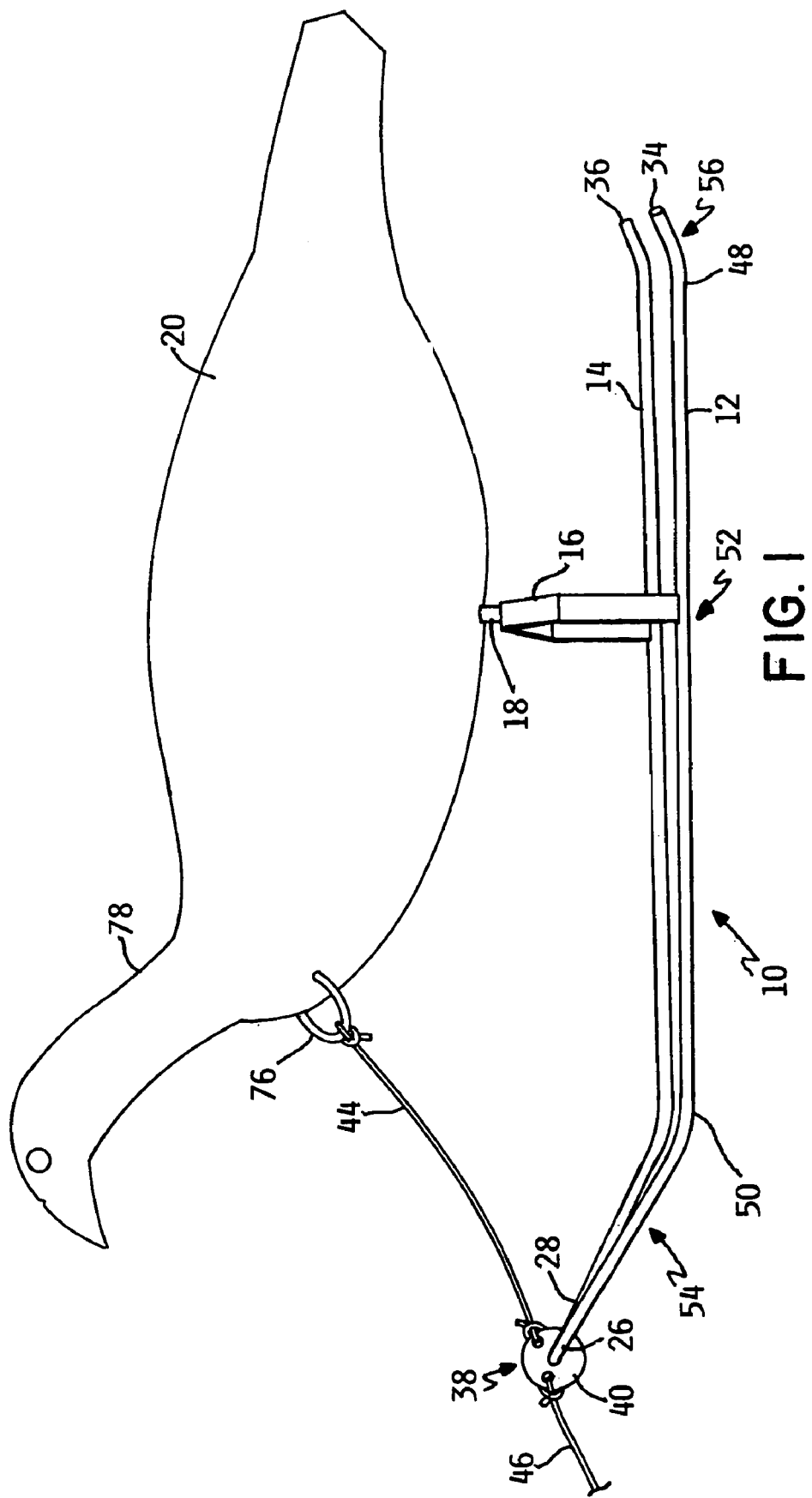
FIG. 1 is a side view of a decoy sled in accordance with the present invention on which a suitable molded covering is placed to resemble a hen.

Referring to the drawings, a decoy sled 10 is illustrated. Sled 10 includes a first runner 12 and a second runner 14 that are joined at a bow 38. The runners 12 and 14 are comprised of three general sections. A mid section 52 is located between junction 48 and junction 50. Mid section 52 is generally parallel to a horizontal plane and allows for relatively smooth movement of sled 10 over a variety of terrain.

Runners 12 and 14 also include front sections 54, which are located between junction 50 and bow 30. Front sections 54 are preferably located at an angle with respect to the horizontal plane. In one embodiment, front sections 54 are located at least 10 degrees from the horizontal plane, preferably at least 20 degrees from a horizontal plane, more preferably between 30 and 60 degrees from a horizontal plane.

Runners 12 and 14 also include rear sections 56, which are located to the rear of junction 48. Rear sections 56 are preferably located at an angle with respect to the horizontal plane. In one embodiment, rear sections 56 are located at least 5 degrees from the horizontal plane, preferably at least 10 degrees from the horizontal plane, more preferably between 20 and 40 degrees from the horizontal plane.

A support arch 24 spans between the mid sections of runners 12 and 14. Support arch 24 includes a first end 30, a second end 32, and a midpoint 24. First end 30 is attached to midsection 52 of first runner 12. Second end 32 is attached to midsection 52 of second runner 14.

Figure 2:
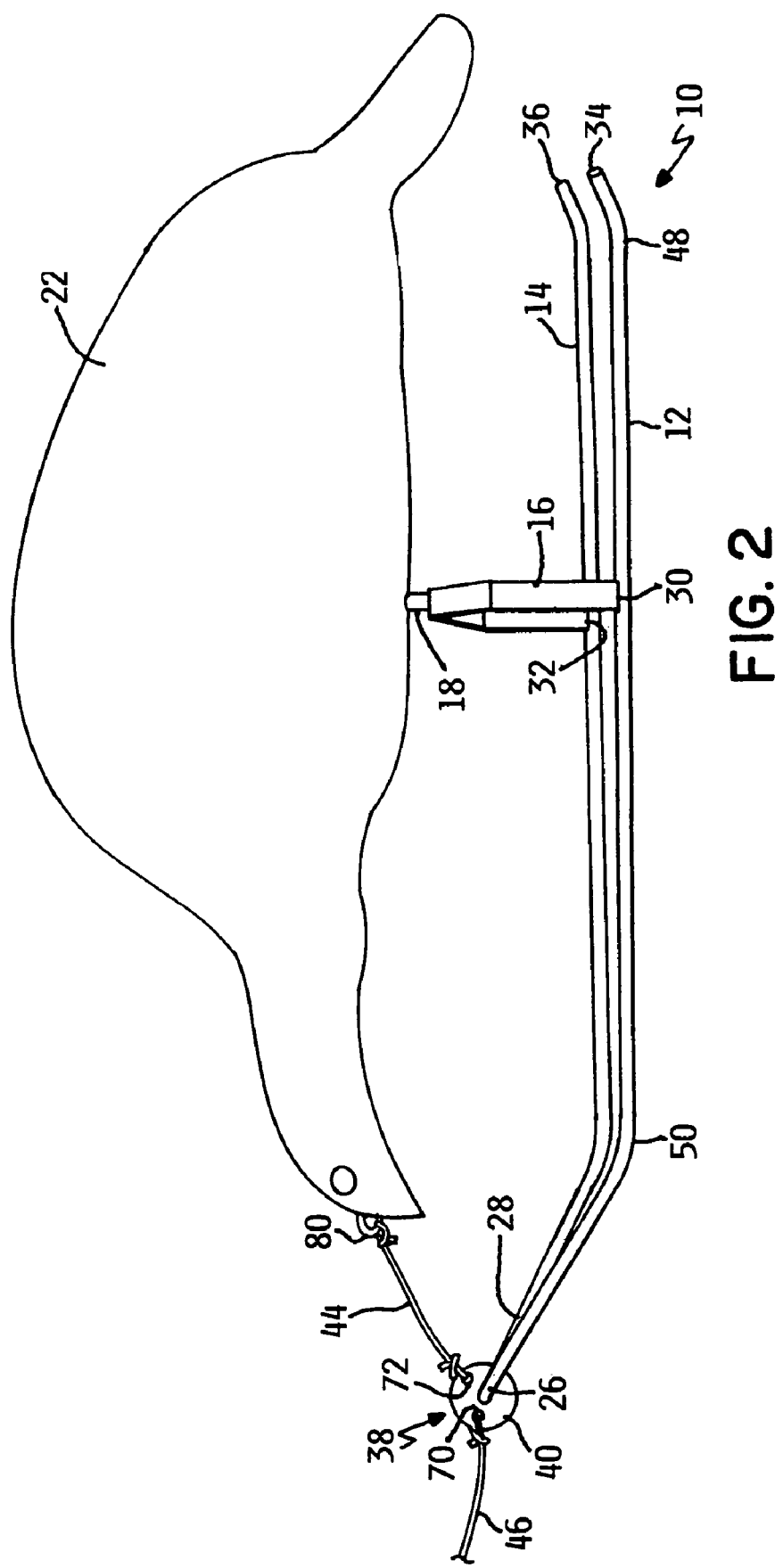
FIG. 2 is a side view of a decoy sled in accordance with the present invention on which a suitable molded covering is placed to resemble a feeding hen.
Figure 3:
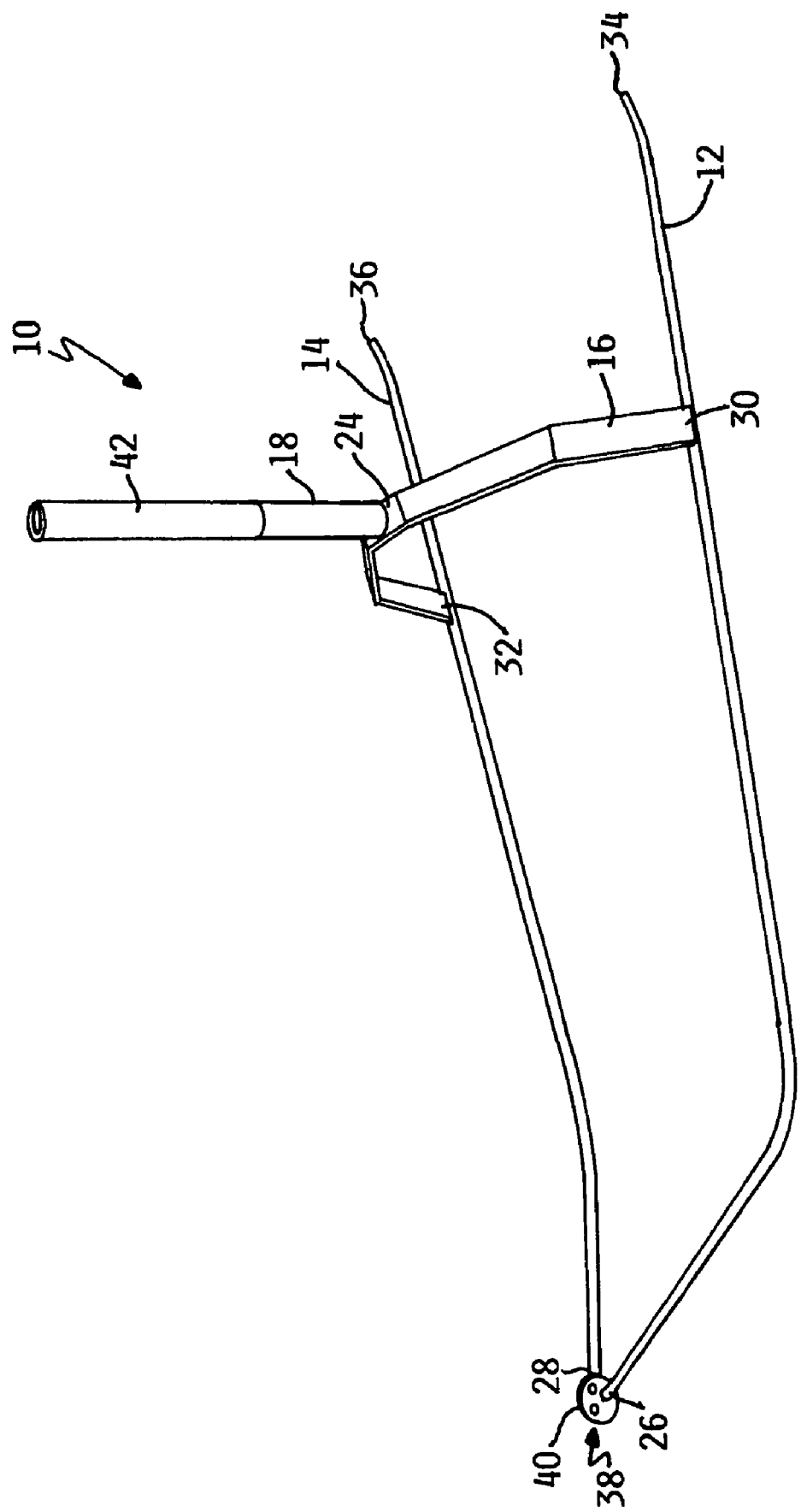
FIG. 3 is an isometric view of the decoy sled in accordance with the present invention.
Figure 4:
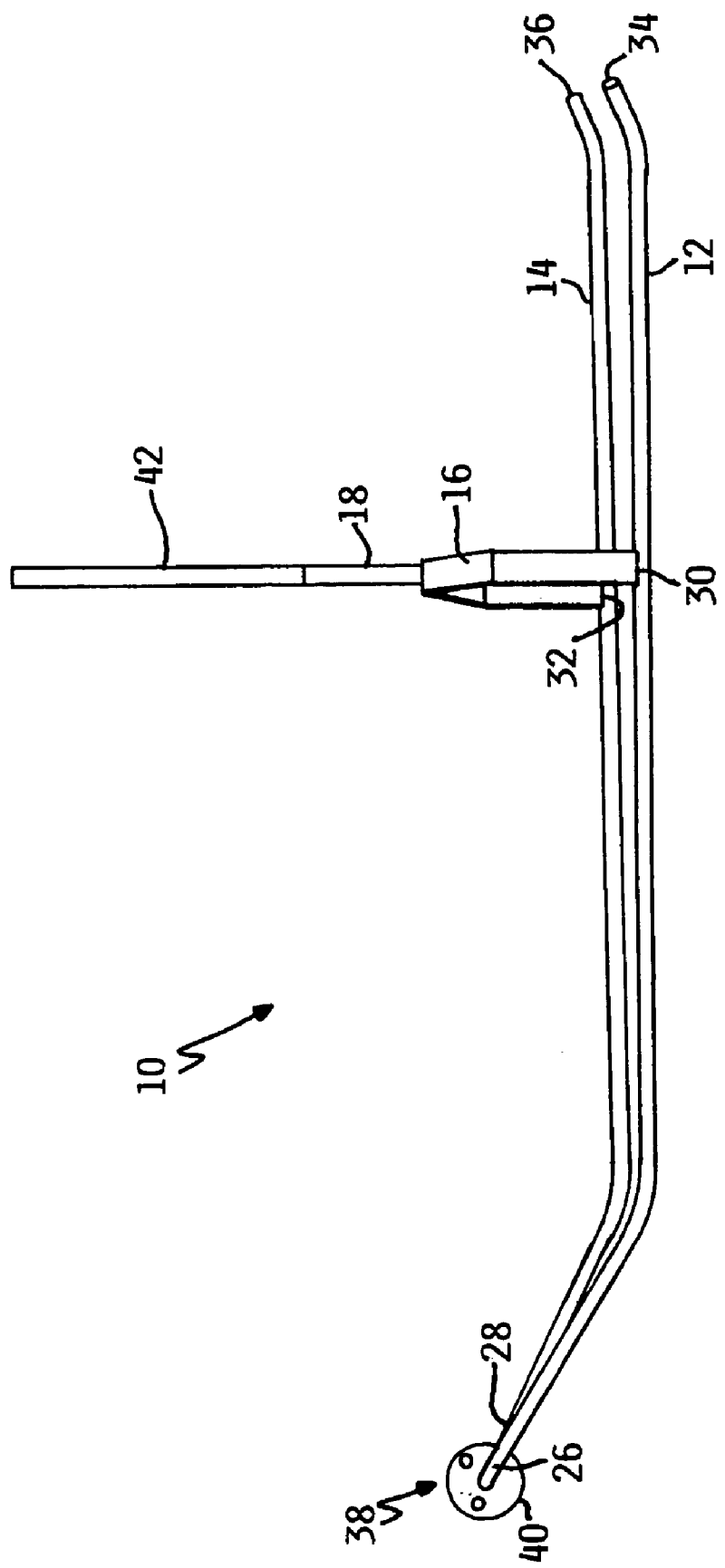
FIG. 4 is a side view of a decoy sled in accordance with the present invention.
Figure 5:
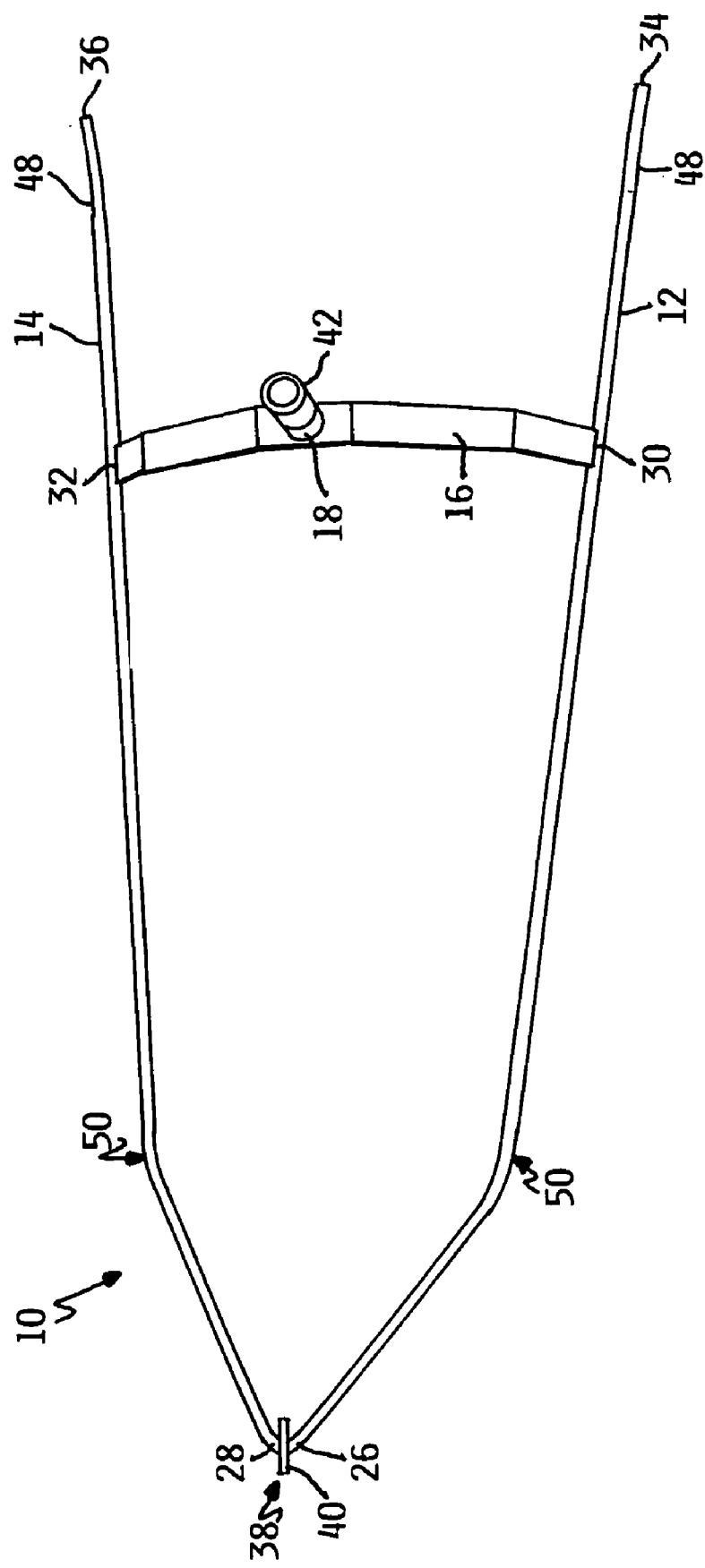
FIG. 5 is a top view of a decoy sled in accordance with the present invention.
Figure 6:
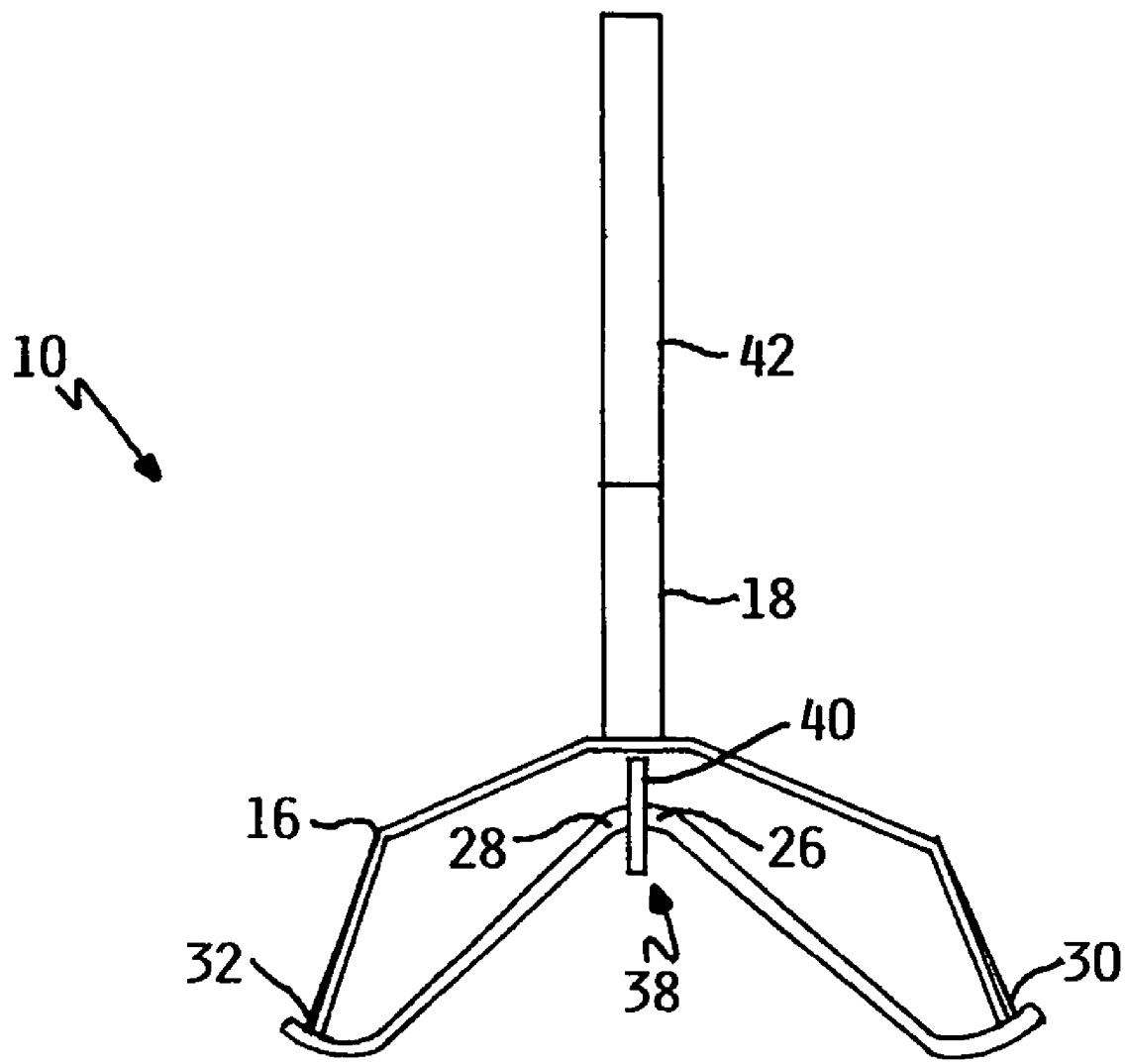
FIG. 6 is a front view of a decoy sled in accordance with the present invention.

In a preferred embodiment, a receiver 18 is fastened to the support arch 16 at midpoint 24. Receiver 18 can be fabricated from a steel pipe that is 3 inches long and 0.5 inches in diameter. Pole 42 can be disposed inside receiver 18 to support decoy 20. In this configuration decoy body is permitted to bob or rotate fore and aft on pole 42. According to one embodiment, the decoy body is a flexible plastic molding as shown in FIG. 1. In another embodiment, the decoy body is the shape of a feeding hen as shown in FIG. 2. Alternatively, receiver 18 may comprise a bolt or a spike that is fastened to the support arch 16 at midpoint 24. Pole 42 can include a hollow dowel or tube disposed over the receiver.

Fender 40 can be disposed about the bow 38. In a preferred embodiment runners 12 and 14 are fabricated from 0.25 inch steel rod that is bent about its midpoint into the configuration shown in the drawing figures. Fender 40 is preferably fabricated of a 0.25 inch fender washer, although a variety of materials can be used while remaining within the scope of the invention.

The dimensions of the sled will now be discussed. The runners 12 and 14 are typically between 1 and 3 feet long. This enables the sled to move across various terrain without getting hung-up or tipping over. The front sections 54 of runners 12 and 14 are typically between 4 inches and 12 inches long, preferably between 6 and 10 inches long. Mid-sections 52 of runners 12 and 14 are typically between 10 inches long and 24 inches long. It will be appreciated by those skilled in the art that longer mid-sections 52 will provide greater stability for sled 10. Rear sections 56 can be useful for guiding the rear sections of sled 10 through difficult terrain. Rear sections 56 can be between 0.25 inches and 12 inches, preferably between, 0.5 inches and 2 inches, more preferably 0.6 inches and 1 inch.

The configuration of support arch 16 will now be discussed. Arch 16 is preferably configured so that midpoint 24 provides clearance for sled 10 as it traverses the ground. In one embodiment, midpoint 24 is at least 1 inch away from the horizontal plane defined by the mid-sections of runners 12 and 14. In a preferred embodiment, midpoint 24 is at least 2 inches away from the horizontal plane defined by the mid-sections of runners 12 and 14, more preferably at least 3 inches away from the horizontal plane defined by the mid-sections of runners 12 and 14.

It is important that the location of arch 16 along runners 12 and 14 be configured to provide a sufficient center of gravity for the decoy 20 so that it will not fall over when traversing difficult terrain. For example, if arch 16 is located too close to the bow of the sled, the sled 10 will be more likely to tip over the front end. Alternatively, if arch 16 is located to close to the rear sections 56 of runners 12 and 14, the sled 10 will likely tip over backwards. Similarly, the distance between first runner 12 and second runner 14 should be far enough apart to prevent sled 10 from tipping over sideways. In one embodiment, rear tip 34 and rear tip 36 are at least 4 inches apart. In a preferred embodiment, rear tip 34 and rear tip 36 are at least 5 inches apart, more preferably at least 6 inches apart. This configuration will allow for quick set-up and traversal through a variety of terrain.

Fender 40 includes two apertures in addition to the large center aperture in which the rod is disposed. For example, aperture 72 is useful for securing decoy 20 to the sled. In a preferred embodiment, a string 44 is fastened to fender 40 through aperture 72. The other end of the string 44 is used to secure decoy 20. For example string 44 may secure decoy 20 through a hook 76 or simply by tying the string 44 around the neck of the decoy 20. When a feeding hen 22 is used, as shown in FIG. 2, string 44 may be attached to a nose ring 80. In a preferred embodiment, string contains some degree of slack to allow decoy 20 to rotate about pole 42, simulating a "waddling" motion as the sled 10 traverses irregular terrain.

Fender 40 also includes aperture 70. In a preferred embodiment, string 46 may pass through aperture 70 and enable a user to pull on the string to move the sled. In one embodiment, string 46 may be attached to a fishing reel, or similar device to move the sled 10. A fishing reel enables a user to pull the decoy 20, giving the decoy life-like movement. This can help bring the male turkey into optimum range.

The method of manufacturing the sled 10 will now be discussed. A 4 foot long steel rod measuring 0.25 inches in diameter is bent at its midpoint creating runners 12 and 14. Next, a 0.25 inch fender washer is sled onto and welded to the midpoint of the rod. Two additional holes are drilled into the washer providing a location for the string. A 0.5 inch flat stock measuring approximately 12 inches long is bent to form the support arch 16. A 0.5 inch steel pipe measuring 3" long is welded to the midpoint of the support arch 16. Alternatively, an upside-down bolt may be welded to the support arch 16 as discussed above. Ends of support arch 16 are also welded to the desired area of runners 12 and 14, approximately two-thirds of the way toward the rear of sled 10. Next, rear sections 56 and front sections 54 are bent into the desired angles.

Next, a pole 42 is inserted into the aperture of the receiver 18 and an animal decoy 20 is placed over the pole 42 and secured on the sled. To prevent over rotation of the decoy 20 on the sled 10, a string 28 is secured to the decoy 20 and the fendor 40. In a preferred embodiment, the string 28 contains enough slack to allow for at least 10 degrees of rotation, preferably at least 20 degrees of rotation, more preferably at least 30 degrees of rotation. String 28 may be fabricated of nylon, although standard fishing wire will also be adequate.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A sled for supporting a covering to provide a decoy, comprising:
   a first runner,
   a second runner, wherein the first runner and the second runner each have a front tip and a rear tip, wherein the front tip of the first runner is attached to the front tip of the second runner at a bow,
   an arch having a first end, a second end, and a midpoint wherein the first runner is fastened to the first end of the arch and the second runner is fastened to the second end of the arch, wherein the arch is fastened to the first runner at least 2 inches away from the rear tip of the first runner and the arch is fastened to the second runner at least 2 inches away from the rear tip of the second runner,
   a receiver located at the midpoint of the arch, wherein the receiver defines an aperture that is at least 0.25 inches in diameter,
   a pole extending vertically from the aperture of the receiver,
   a fender attached to the bow of the sled, wherein the fender comprises at least one aperture,
   an animal body decoy disposed around the pole; and,
   a string attached to the animal body and the aperture of the fender.

2. The sled of claim 1, wherein the animal body decoy has the appearance of a wild turkey.

3. The sled of claim 1, wherein the animal body decoy has the appearance of a feeding hen.

4. The sled of claim 1, further comprising a fishing reel, and,
   a second string,
   wherein the second string connects the fishing reel and the fender for providing movement of the sled.

5. A sled for supporting a decoy, comprising:
   a singe rod defining a midpoint, a first runner and a second runner, wherein the midpoint is located between the first runner and the second runner, the first runner and the second runner having a mid section;
   a support comprising a first end, a second end, and a midpoint, wherein the first end of the support is fastened to the mid section of the first runner and the second end of the support is fastened to the mid section of the second runner,
   a receiver fastened to the midpoint of the support, the receiver defining at least one aperture,
   a post extending vertically from the receiver, wherein the post is at least partially disposed in the aperture of the receiver;
   a animal decoy supported by the post, and;

a first string spanning between the decoy and the midpoint of the rod, and;

a second string attached to the midpoint of the rod for providing movement of the sled.

6. A sled for supporting a decoy, comprising:

a rod defining a midpoint, a first runner and a second runner, wherein the midpoint of the rod is located between the first runner and the second runner, and wherein the first runner and the second runner include a mid section and a front section;

a support comprising a first end, a second end, and a midpoint, wherein the first end of the support is fastened to the mid section of the first runner and the second end of the support is fastened to the mid section of the second runner;

a post fastened to the support;

an animal decoy supported by the post;

a first string spanning from the animal decoy to the midpoint of the rod, a second string attached to the midpoint of the rod, the second string configured to provide movement of the sled.

\* \* \* \* \*